(12) United States Patent
Reed et al.

(10) Patent No.: US 10,579,440 B2
(45) Date of Patent: Mar. 3, 2020

(54) VIRTUAL RESOURCE CONTROL AND DISTRIBUTION

(71) Applicant: BANK OF AMERICA CORPORATION, Charlotte, NC (US)

(72) Inventors: Alfred James Reed, Huntersville, NC (US); Huihui Wu, Long Island, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 199 days.

(21) Appl. No.: 15/805,840

(22) Filed: Nov. 7, 2017

(65) Prior Publication Data
US 2019/0138363 A1 May 9, 2019

(51) Int. Cl.
G06F 9/50 (2006.01)

(52) U.S. Cl.
CPC .......... *G06F 9/5077* (2013.01); *G06F 9/5027* (2013.01)

(58) Field of Classification Search
USPC ....................................................... 717/148
See application file for complete search history.

(56) References Cited

U.S. PATENT DOCUMENTS

| | | | |
|---|---|---|---|
| 5,963,924 A | 10/1999 | Williams et al. | |
| 6,016,484 A | 1/2000 | Williams et al. | |
| 6,401,079 B1 | 6/2002 | Kahn et al. | |
| 6,721,783 B1 | 4/2004 | Blossman et al. | |
| 6,752,313 B1 | 6/2004 | Caviles et al. | |
| 7,032,031 B2 | 4/2006 | Jungck et al. | |
| 7,110,969 B1 | 9/2006 | Bennett et al. | |
| 7,114,008 B2 | 9/2006 | Jungck et al. | |
| 7,440,915 B1 | 10/2008 | Ulrich | |
| 7,676,431 B2 | 3/2010 | OLeary et al. | |
| 7,680,735 B1 | 3/2010 | Loy | |
| 7,680,737 B2 | 3/2010 | Smith, Jr. et al. | |
| 7,693,783 B2 | 4/2010 | Balasubramanian et al. | |
| 7,801,814 B2 | 9/2010 | Cataline et al. | |
| 7,822,656 B2 | 10/2010 | Knight et al. | |
| 7,822,688 B2 | 10/2010 | Labrou et al. | |
| 8,001,025 B2 | 8/2011 | Vadhri | |
| 8,005,754 B2 | 8/2011 | McCoy et al. | |
| 8,010,424 B1 | 8/2011 | Hamilton et al. | |

(Continued)

*Primary Examiner* — Chuck O Kendall
(74) *Attorney, Agent, or Firm* — Michael A. Springs; Moore & Van Allen PLLC; Jeffrey R. Gray

(57) ABSTRACT

A virtual resource control and distribution system is provided that utilizes virtual resource pools coupled to authentic resource pools in order to reduce processing capacity requirements, memory requirements, and processing time. In particular, the present invention utilizes a reduced number of authentic resource pools, such as one single authentic resource pool, that is coupled to one or more virtual resource pools. The virtual resource pools may be utilized to enter into interactions. However, when interactions are entered, the virtual resource pools may be adjusted based on the resources associated with the interaction without actually having any resources associated with the virtual resource pools. As such, the virtual resource pools may illustrate a change in virtual resources in the virtual resource pool, but the authentic resource pool to which the virtual resource pool is associated, will be utilized for distributing the resources and processing the interactions.

20 Claims, 5 Drawing Sheets

(56) References Cited

U.S. PATENT DOCUMENTS

| | | |
|---|---|---|
| 8,121,945 B2 | 2/2012 | Rackley, III et al. |
| 8,140,429 B2 | 3/2012 | Balasubramanian et al. |
| 8,254,658 B2 | 8/2012 | Hamilton |
| 8,255,324 B2 | 8/2012 | Bercy et al. |
| 8,285,641 B2 | 10/2012 | Cataline et al. |
| 8,290,862 B2 | 10/2012 | Sheehan et al. |
| 8,328,095 B2 | 12/2012 | Oder, II et al. |
| 8,407,140 B2 | 3/2013 | Ayala et al. |
| 8,438,086 B2 | 5/2013 | Rosko et al. |
| 8,458,070 B2 | 6/2013 | Rosko et al. |
| 8,473,324 B2 | 6/2013 | Alvarez et al. |
| 8,645,266 B2 | 2/2014 | Balasubramanian et al. |
| 8,650,118 B2 | 2/2014 | Balasubramanian et al. |
| 8,875,990 B2 | 11/2014 | Bishop et al. |
| 8,924,294 B2 | 12/2014 | Lynch et al. |
| 9,215,231 B1 | 12/2015 | Bowen |
| 9,367,753 B2 | 6/2016 | Li et al. |
| 9,495,680 B2 | 11/2016 | Oder, II et al. |
| 9,691,278 B2 | 6/2017 | Poomachandran et al. |
| 9,722,879 B1 * | 8/2017 | Muthu .............. H04L 67/1097 |
| 9,779,392 B1 | 10/2017 | Prasad et al. |
| 9,959,531 B2 | 5/2018 | Purves et al. |
| 10,154,084 B2 | 12/2018 | Kalgi |
| 10,157,436 B2 | 12/2018 | Samocha et al. |
| 2003/0099237 A1 | 5/2003 | Mitra et al. |
| 2004/0148252 A1 | 7/2004 | Fleishman |
| 2005/0065678 A1 | 3/2005 | Smith et al. |
| 2006/0161604 A1 | 7/2006 | Lobo |
| 2006/0206425 A1 | 9/2006 | Sharma |
| 2009/0262741 A1 | 10/2009 | Jungck et al. |
| 2010/0103837 A1 | 4/2010 | Jungck et al. |
| 2010/0280909 A1 | 11/2010 | Zhang et al. |
| 2011/0055077 A1 | 3/2011 | French et al. |
| 2011/0270733 A1 | 11/2011 | Chazen |
| 2012/0233066 A1 | 9/2012 | Vallabhaneni |
| 2012/0259777 A1 | 10/2012 | Rosko et al. |
| 2013/0110709 A1 | 5/2013 | Hodge et al. |
| 2013/0163746 A1 | 6/2013 | Wick et al. |
| 2013/0173437 A1 | 7/2013 | Capparell et al. |
| 2013/0208879 A1 | 8/2013 | Rosenhaft et al. |
| 2013/0346302 A1 | 12/2013 | Purves et al. |
| 2014/0201070 A1 | 7/2014 | Liberty |
| 2014/0214649 A1 | 7/2014 | DuCharme et al. |
| 2014/0244500 A1 | 8/2014 | Elias |
| 2014/0279404 A1 | 9/2014 | Kallimani et al. |
| 2014/0297520 A1 | 10/2014 | Levchin et al. |
| 2014/0372751 A1 | 12/2014 | Silverstone |
| 2015/0032605 A1 | 1/2015 | Williams et al. |
| 2016/0055583 A1 | 2/2016 | Liberty et al. |
| 2016/0086184 A1 | 3/2016 | Carpenter et al. |
| 2016/0110721 A1 | 4/2016 | Russell et al. |
| 2016/0232518 A1 | 8/2016 | Butler |
| 2016/0247037 A1 | 8/2016 | Li et al. |
| 2016/0253639 A1 | 9/2016 | Sharma |
| 2016/0328711 A1 | 11/2016 | Elischer |
| 2016/0379192 A1 | 12/2016 | Purves et al. |
| 2017/0032352 A1 | 2/2017 | Koeppen et al. |
| 2017/0091791 A1 | 3/2017 | Srinivasan et al. |
| 2017/0091873 A1 | 3/2017 | Cole et al. |
| 2017/0109717 A1 | 4/2017 | Vafeas |
| 2017/0134479 A1 | 5/2017 | Kalgi |
| 2017/0169420 A1 | 6/2017 | Setlur et al. |
| 2017/0178110 A1 | 6/2017 | Swanson et al. |
| 2017/0178126 A1 | 6/2017 | Liu et al. |
| 2018/0129945 A1 | 5/2018 | Saxena et al. |
| 2018/0129952 A1 | 5/2018 | Saxena et al. |
| 2018/0129953 A1 | 5/2018 | Saxena et al. |
| 2018/0129954 A1 | 5/2018 | Saxena et al. |
| 2018/0129955 A1 | 5/2018 | Saxena et al. |
| 2018/0129956 A1 | 5/2018 | Saxena et al. |
| 2018/0129957 A1 | 5/2018 | Saxena et al. |
| 2018/0129958 A1 | 5/2018 | Saxena et al. |
| 2018/0143975 A1 | 5/2018 | Casal et al. |
| 2018/0165416 A1 | 6/2018 | Saxena et al. |
| 2018/0165585 A1 | 6/2018 | Saxena et al. |
| 2018/0165586 A1 | 6/2018 | Saxena et al. |
| 2018/0165588 A1 | 6/2018 | Saxena et al. |
| 2018/0165598 A1 | 6/2018 | Saxena et al. |
| 2018/0165611 A1 | 6/2018 | Saxena et al. |
| 2018/0165612 A1 | 6/2018 | Saxena et al. |
| 2018/0165758 A1 | 6/2018 | Saxena et al. |
| 2018/0189756 A1 | 7/2018 | Purves et al. |
| 2018/0247544 A1 | 8/2018 | Mustafic et al. |
| 2019/0012646 A1 | 1/2019 | Seidl et al. |
| 2019/0057378 A1 | 2/2019 | Rudnick et al. |
| 2019/0075156 A1 | 3/2019 | Kalgi |

\* cited by examiner

VIRTUAL RESOURCE CONTROL AND DISTRIBUTION

FIELD

The present invention relates to utilizing a virtual resource control and distribution system, and more particularly, the system utilizes a plurality of virtual resource pools coupled to one or more authentic resource pools to control and distribute resources in a way that reduces the processing capacity needed, decreases the memory requirements, and decreases processing times.

BACKGROUND

When utilizing actual resource pools each action taken with respect to the resource pools must be tracked, processed, and stored. The tracking, processing, and storage of the actions have not changed over time. Resource pool tracking, processing, and storage technology improvements are needed to optimize utilization of the resource pools.

BRIEF SUMMARY

Embodiments of the present invention address these and/or other needs by providing innovative systems, methods and computer program products for utilizing a virtual resource control and distribution system that utilizes virtual resource pools coupled to authentic resource pools in order to reduce processing capacity requirements, memory requirements, and processing time. In particular, the present invention utilizes a reduced number of authentic resource pools, such as one single authentic resource pool, that is coupled to one or more virtual resource pools. The virtual resource pools may be utilized to enter into interactions. However, when interactions are entered, the virtual resource pools may be adjusted based on the resources associated with the interaction without actually having any resources associated with the virtual resource pools. As such, the virtual resource pools may illustrate a change in virtual resources in the virtual resource pool, but the authentic resource pool to which the virtual resource pool is associated, will be utilized for distributing the resources and processing the interactions.

Consequently, due to the use of the virtual resource pools, the processing of resources for each of the virtual resources pools is not required, which reduces the amount of memory storage that is needed because of the reduction of the processing requirements. Moreover, the processing capacity is increased because a reduced number of processing steps are omitted by using the virtual resource pools. Furthermore, the processing time is reduced because the processing associated with distribution of resources between various resource pools is not required. The processing and storage for interactions are centralized in a single authentic resource pool. Moreover, the present invention streamlines the operations of the organization providing the resource pools because entities may access the resource systems in order to control and configure the virtual resource pools as the entities see fit without the organization having to be involved in the configuration process. The present invention enables entities to self-serve their own needs for virtual resource pool set-up and maintenance by accessing one or more interfaces through one or more portals.

Embodiments of the invention comprise systems, computer implemented methods, and computer program products for controlling and distributing resources. The invention comprises receiving interaction indications for interactions between a client and one or more third-party entities, wherein the interaction indications include resource pools utilized for the interactions, and wherein the interaction indications are received from client systems or third party systems. The invention further comprises determining the resource pools that are virtual resource pools, wherein the determination is made by comparing resource pool identifiers received from the interaction indications with stored virtual resource pool identifiers. The invention also comprises determining one or more authentic resource pools associated with the virtual resource pools when any of the resource pools are determined to be the virtual resource pools. The invention further comprises applying an accounting of resources for each of the interactions to each of the virtual resource pools, and distributing the resources for each of the interactions using the one or more authentic resource pools associated with the virtual resource pools.

In further accord with embodiments, the invention comprises establishing the one or more authentic resource pools, establishing the virtual resource pools, coupling the virtual resource pools to the one or more authentic resource pools, and storing the coupling of the one or more authentic resource pools and the virtual resource pools in a resource pool database.

In other embodiments, the invention comprises receiving one or more configurations for the virtual resource pools, and wherein applying the accounting of the resources for each of the interactions to each of the virtual resource pools, and distributing the resources for each of the interaction using the one or more authentic resource pools is further based on the one or more configurations associated with the virtual resource pools.

In yet other embodiments of the invention, the one or more configurations comprise at least a resource type associated with the virtual resource pools, and wherein the resources are converted based on the resource type before distributing the resources using the one or more authentic resource pools.

In still other embodiments of the invention, establishing the one or more authentic resource pools comprises creating resource pools or identifying the resource pools through which actual resources are stored, added to, and removed from.

In further accord with embodiments of the invention, establishing the one or more virtual resource pools comprises creating resource pools or identifying the resource pools through which virtual resources are accounted.

In other embodiments of the invention, coupling the virtual resource pools to the one or more authentic resource pools comprises assigning virtual resource pool identifiers of the virtual resource pools to an authentic resource pool identifier of the one or more authentic resource pools.

In yet other embodiments, the invention further comprises receiving an activation indication for at least one of the virtual resource pools, and activating the at least one of the virtual resource pools, wherein after activation the at least one of the virtual resource pools may be utilized for the interactions.

In still other embodiments, the invention further comprises receiving a deactivation indication for at least one of the virtual resource pools, and deactivating the at least one of the virtual resource pools, wherein after deactivation the at least one of the virtual resource pools may not be used for the interactions.

In further accord with embodiments, the invention comprises receiving a configuration edit indication of at least one of the virtual resource pools, and editing the configuration of the at least one of the virtual resource pools.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
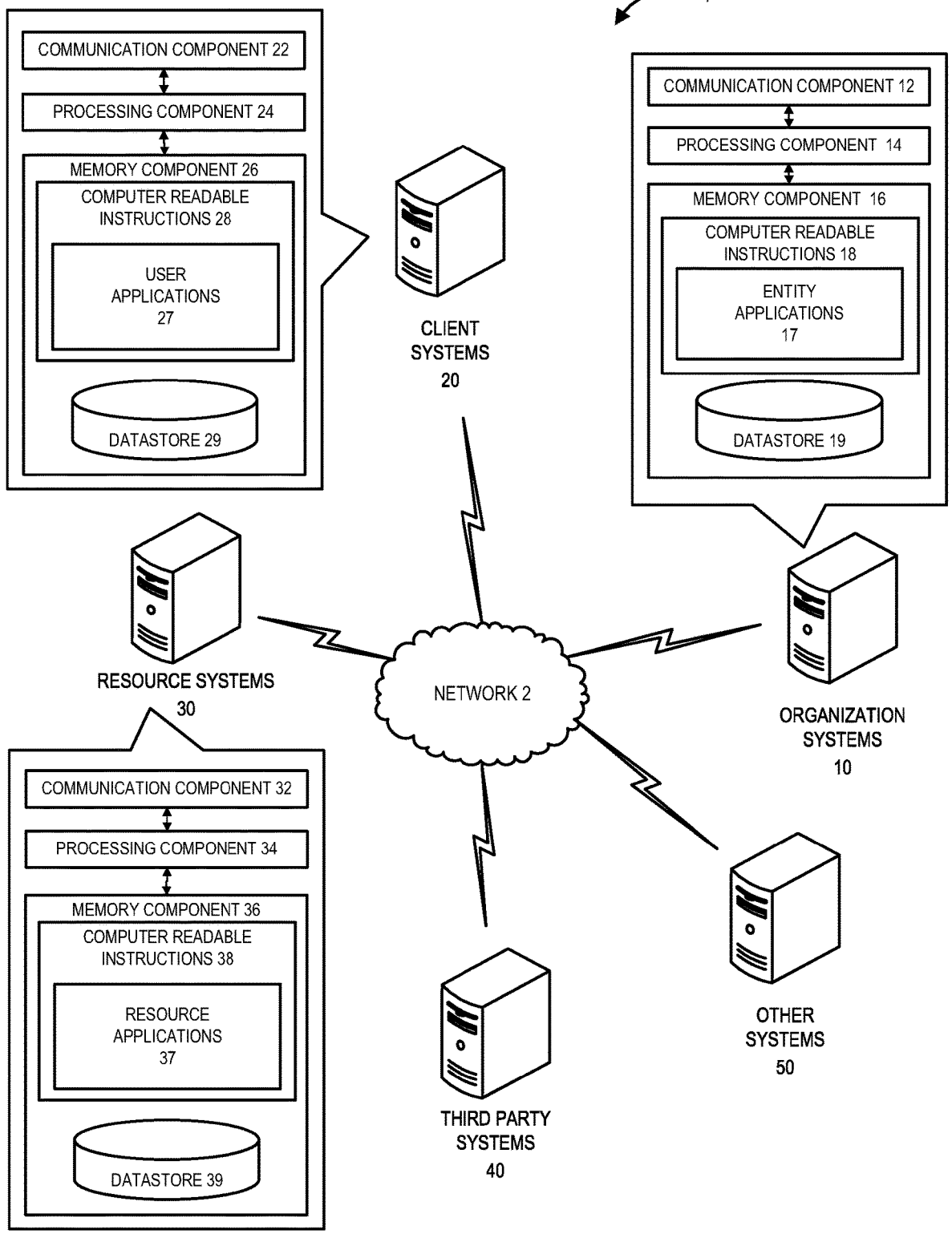

Having thus described embodiments of the invention in general terms, reference will now be made the accompanying drawings, wherein:

FIG. 1 illustrates a block diagram of a virtual resource control and distribution system environment, in accordance with embodiments of the invention.

Figure 2:
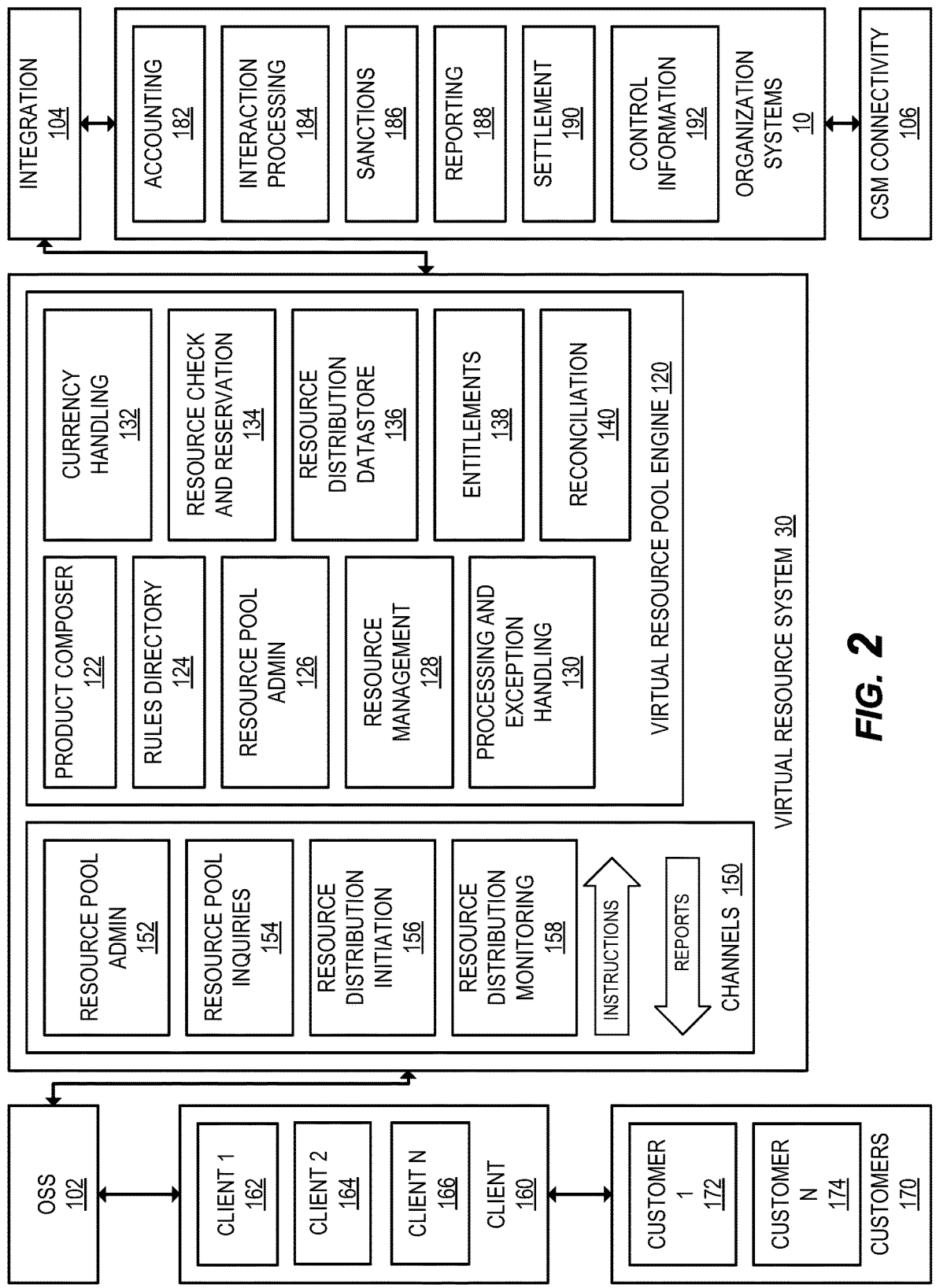

FIG. 2 illustrates a block diagram of a virtual resource system, in accordance with embodiments of the invention.

Figure 3:
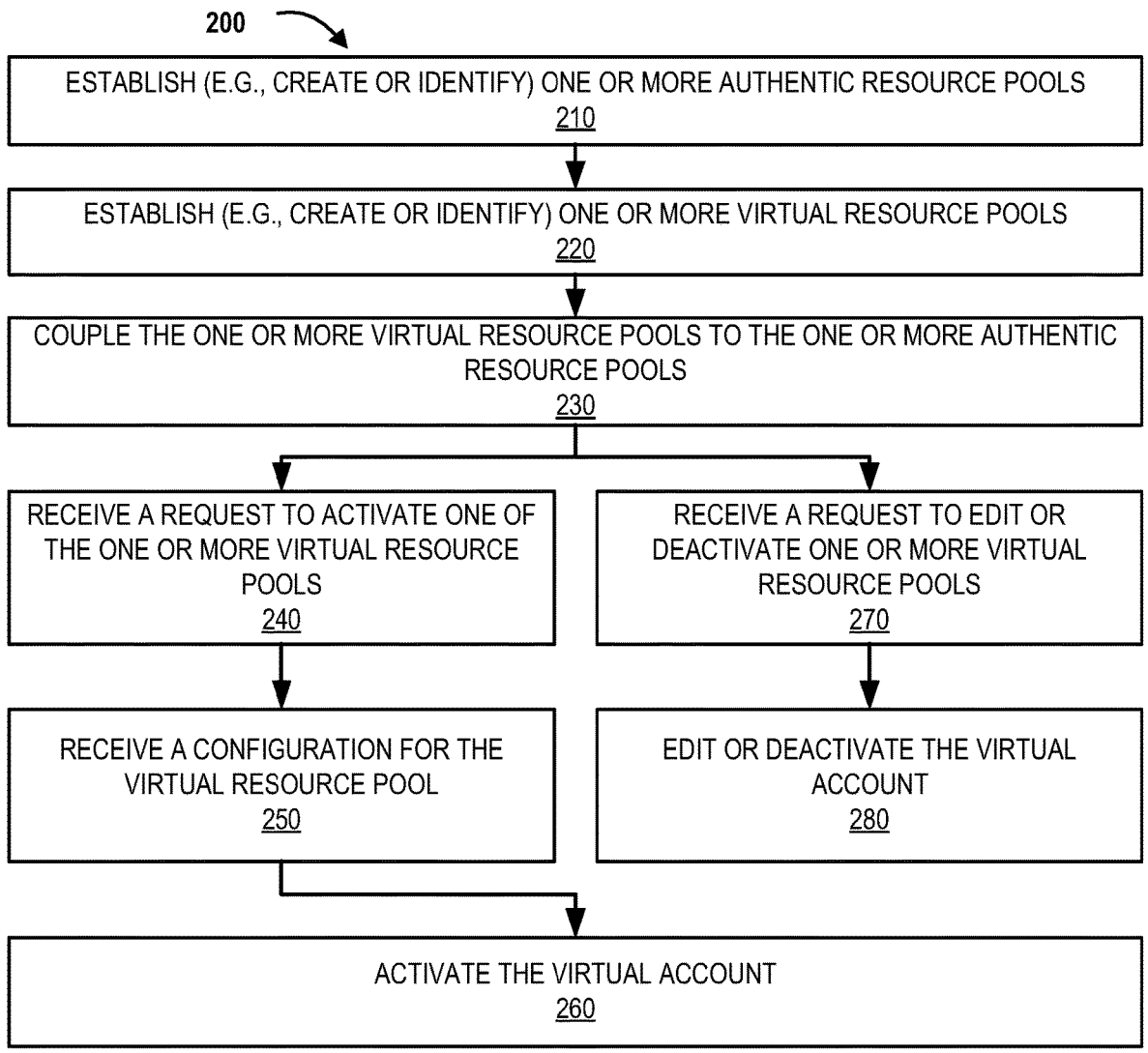

FIG. 3 illustrates a flow diagram for establishing and controlling the virtual resource pools, in accordance with embodiments of the invention.

Figure 4:
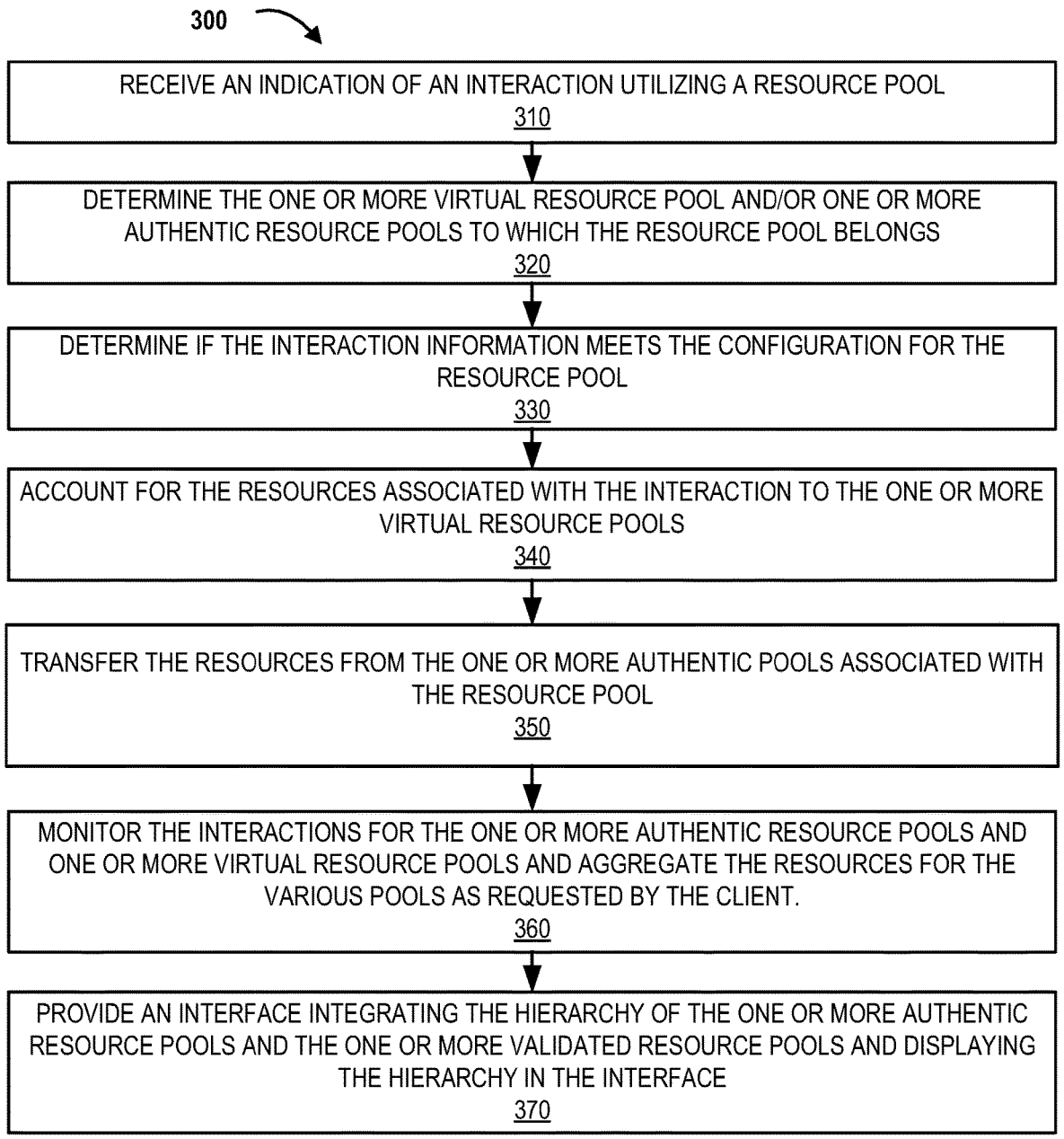

FIG. 4 presents a flow diagram for utilizing the virtual resource pools, in accordance with embodiments of the invention.

Figure 5:
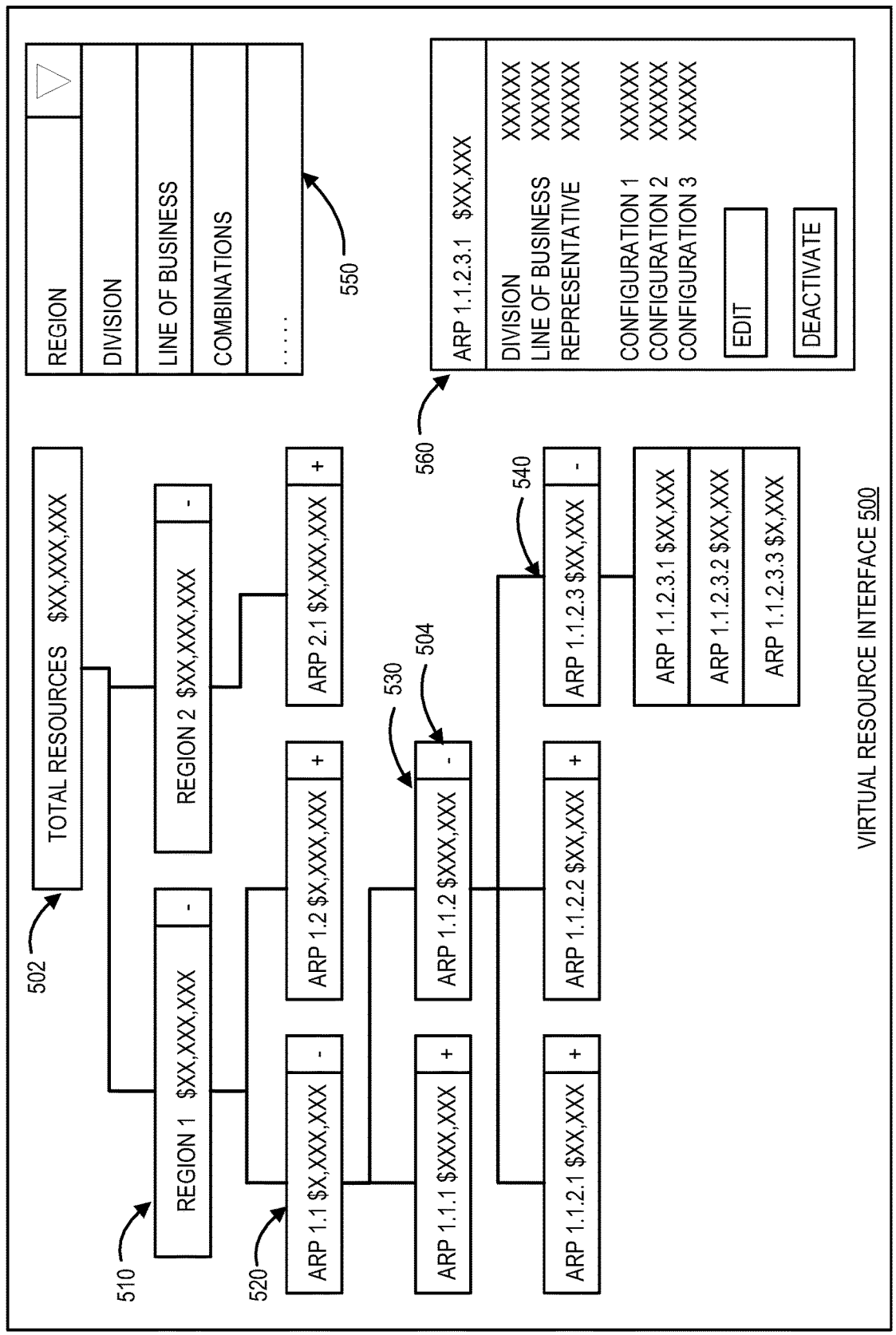

FIG. 5 presents an interface which an entity may access through a portal in order to manage and view the entity's one or more authentic resource pools and one or more virtual resource pools, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements.

Embodiments of the present invention provide innovative systems, methods and computer program products for utilizing a virtual resource control and distribution system that utilizes virtual resource pools coupled to authentic resource pools in order to reduce processing capacity requirements, memory requirements, and processing time. In particular, the present invention utilizes a reduced number of authentic resource pools, such as one single authentic resource pool, that is coupled to one or more virtual resource pools. The virtual resource pools may be utilized to enter into interactions. However, when interactions are entered, the virtual resource pools may be adjusted based on the resources associated with the interaction without actually having any resources associated with the virtual resource pools. As such, the virtual resource pools may illustrate a change in virtual resources in the virtual resource pool, but the authentic resource pool to which the virtual resource pool is associated, will be utilized for distributing the resources and processing the interactions.

Consequently, due to the use of the virtual resource pools, the processing of resources for each of the virtual resources pools is not required, which reduces the amount of memory storage that is needed because of the reduction of the processing. Moreover, the processing capacity is increased because a reduced number of processing steps are omitted by using the virtual resource pools. Furthermore, the processing time is reduced because the processing associated with distribution of resources between various resource pools is not required. The processing and storage for interactions are centralized in a single authentic resource pool. Moreover, the present invention streamlines the operations of the organization providing the resource pools because entities may access the resource systems in order to control and configure the virtual resource pools as the entities see fit without the organization having to be involved in the configuration process. The present invention enables entities to self-serve their own needs for virtual resource pool set-up and maintenance by accessing one or more interfaces through one or more portals.

FIG. 1 illustrates a virtual resource control and distribution system environment 1, in accordance with embodiments of the invention. As illustrated in FIG. 1, one or more organization systems 10 are operatively coupled, via a network 2, to one or more client systems 20, one or more resource systems 30, one or more third-party systems 40, and/or one or more other systems 50. In this way, clients may utilize the one or more client systems 20 to control the virtual resource pools and authentic resource pools, and the resources therein, and utilize such resource pools for interactions.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" or "processor" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the one or more client systems 20, the one or more resource systems 30, the one or more third-party systems 40, or the one or more other systems 50. As such, the one or more communication components 12 generally comprise a wireless transceiver, modem, server, electrical connection, electrical circuit, or other component for electronically communicating with other components on the network 2. The one or more communication components 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memory component 16, which in one embodiment includes the computer-readable instructions 18 of one or more organization applications 17. In some embodiments, the one or more memory components 16 include one or more data stores 19 for storing data related to the one or more organization systems 10, including, but not limited to, data created, accessed, and/or used by the one or more organization application 17. The one or more organization applications 17 may be utilized by the one or more organizations to provide the processing associated with the resources for various interactions for the one or more clients.

As illustrated in FIG. 1, the one or more clients may access the one or more organization applications 17 on the organization systems 10, the one or more resource applications 37 on the one or more resource systems 30, and/or interact with the one or more third-party application on the one or more third-party systems 40 through the one or more client systems 20, such as through the use of one or more client applications 27, to control and process resource pools and enter interactions using the resource pools. The one or more clients systems 20 may generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the one or more organization systems 10, the one or more resource systems 30, the one or more third party systems 40, or the one or more other systems 50. As such, the one or more communication components 22 generally comprise a wireless transceiver, modem, server, electrical connection, or other component for electronically communicating with other components on the network 2. The one or more communication components 22 may further include an interface that accepts one or more network interface cards, ports for connection of network components, Universal Serial Bus (USB) connectors and the like.

As illustrated in FIG. 1, the client systems 20 may have computer-readable instructions 28 stored in the one or more memory components 26, which in one embodiment includes the computer-readable instructions 28 of one or more client applications 27. In some embodiments, the one or more memory components 26 include one or more data stores 29 for storing data related to the one or more client systems 20, including, but not limited to, data created, accessed, and/or used by the one or more client applications 27. The one or more client applications 27 may be utilized by the one or more clients in order to control the resource pools and the configurations thereof, as well as the interactions and resources associated therewith.

As illustrated in FIG. 1, the one or more resource systems 30 may be controlled and/or accessed by the one or more organization applications 17 on the one or more organization systems 10 or by the one or more clients applications 27 on the one or more client systems 20 in order to control and/or utilize the virtual resource pools and/or the authentic resource pools, and/or process the interactions associated therewith. The one or more resource systems 30 may generally comprise one or more communication components 32, one or more processing components 34, and one or more memory components 36.

The one or more processing components 34 are operatively coupled to the one or more communication components 32, and the one or more memory components 36. The one or more processing components 34 use the one or more communication components 32 to communicate with the network 2 and other components on the network 2, such as, but not limited to, the one or more organization systems 10, the one or more client systems 20, the one or more third party systems 40, or the one or more other systems 50. As such, the one or more communication components 32 generally comprise a wireless transceiver, modem, server, electrical connection, or other component for electronically communicating with other components on the network 2. The one or more communication components 32 may further include an interface that accepts one or more network interface cards, ports for connection of network components, Universal Serial Bus (USB) connectors and the like.

The resource systems 30 may have computer-readable instructions 38 stored in the one or more memory components 36, which in one embodiment includes the computer-readable instructions 38 of resource instrument applications 37. In some embodiments, the one or more memory components 36 include one or more data stores 39 for storing data related to the one or more resource systems 30, including, but not limited to, data created, accessed, and/or used by the one or more client applications 27 and/or one or more organization systems 17. The one or more resource applications 37 may be utilized to manage the virtual resource pools and the authentic resource pools, as well as the interactions and resources associated therewith.

The one or more third party systems 40 and/or the one or more other systems 50 are operatively coupled to the one or more organization systems 10, the one or more client systems 20, and the one or more resource systems 30, through the network 2. These systems have components that are the same as or similar to the components described with respect to the one or more organization systems 10, the one or more client systems 20, and/or the one or more resource systems 30 (e.g., one or more communication components, one or more processing components, and one or more memory components with computer-readable instructions of one or more applications, one or more datastores, or the like). Thus, the one or more third party systems 40 and/or the one or more other systems 50 communicate with the one or more organization systems 10, the one or more client systems 20, and the one or more resource systems 30, and/or each other in the same or similar way as previously described with respect to the one or more organization systems 10, the one or more client systems 20, and the one or more resource systems 30. The one or more third party systems 40 may be systems of entities (e.g., other businesses, individual users, or the like) that enter into interactions with the clients, as will be discussed throughout. The one or more other systems 50 may be other systems of the organization, client, third-party, or other party whether or not described herein.

It should be understood that when the organization, client, third-party, and/or other entity is described as taking an action, the action may be taken automatically by the system associated with each and/or by a representative (e.g., one or more associates, employees, agents, contractors, sub-contractors, customers, or the like) of the entity. In these cases, one of the one or more systems described herein may be a desktop, laptop, tablet, mobile device (e.g., smartphone device, mobile watch, mobile wearable, or other mobile device), or any other type of computer that generally comprises one or more communication components, one or more processing components, and one or more memory components that a representative (e.g., employee, agent, owner, consultant, or the like) may use to take an action.

FIG. 2 illustrates one embodiment of a virtual resource system 30, in accordance with embodiments of the invention. The virtual resource system 30 described with respect to FIG. 2 may be utilized for the steps of the process described in FIGS. 3 and 4. FIG. 2 generally illustrates that the virtual resource system 30 (e.g., one of the one or more resource systems 30) is utilized to communicate with one or more clients 160 (e.g., client 1 162, client 2, 164, client N 166), through the use of one or more operational support systems (OSS) 102. Thereafter, the one or more clients 160 may communicate with one or more customers 170 (e.g., customer 1 172, customer N 2 174), for example, in order to enter into one or more interactions with the one or more customers 170. The virtual resource systems 30 may also communicate with the organization systems 10 (e.g., one of the one or more organization systems 10), through an integration system 104. As such, the virtual resource systems may interact with accounting 182, interaction processing 184, sanctions 186, reporting 188, settlement 190, control information 192, and/or other like applications or features within the one or more organization systems 10.

It should be understood that the virtual resource systems 30 may comprise a virtual resource pool engine 120 and processing channels engine 150. The virtual resource pool engine 120, may comprise a product composer 122 that is responsible for forming the one or more resource pools; a rules directory 124 that is responsible for routing resources; resource pool administration 126 that is responsible for the configuration of the resource pools; resource management 128 that is responsible for resource management within the resource pools; processing and exception handling 130 that is responsible for processing interactions including exceptions; currency handling 132 that is responsible for interactions in different countries, such as interactions in different countries; resource status and reservation 134 that is responsible for determining the available resources and holding resources; interaction datastore 136 that is responsible for storing details of the interactions; entitlements 138 that are responsible for determining the entities that have access to take actions with respect to the resource pools; reconciliation 140 that is used to reconcile resources with the authentic resource pools, or other like systems. It should be understood that these applications or functions thereof may be combined with each other or separated into the one or more resource applications 37. The processing channels engine 150 may comprise resource pool administration 152 that is responsible for the administration of the resource pools; resource pool inquiries 154 that is responsible for providing information related to the resource pools (e.g., resource amount, or other like resource pool information); resource distribution initiation 156 that is responsible for initiating interactions using the resource pool; resource distribution monitoring 158 that is responsible for monitoring interactions that utilize the resource pools, or other like features or applications. It should be understood that these applications or functions thereof may be combined with each other or separated into the one or more resource applications 37 (e.g., the virtual resource pool engine 120 functions and/or the channel engine 150 function may be combined with each other and/or separated into other functions). It should be further understood that the processing channels engine 150 may receive instructions from the one or more clients 160, through the OSS systems 102, and distribute the resources involved the interactions using the virtual resource pool engine 120. The virtual resource pool engine 120 may route the resources to the correct virtual resource pool, and distribute the resources to or from the authentic resource pool. The virtual resource pool engine 120 may create reports and send the reports through the processing channel engine 150 and OSS systems 102 to the one or more clients 160. It should be understood that the resource systems 30 may be controlled and/or accessed by the organization, the client, and/or by another entity that is accessed by the organization or the client.

FIG. 3 illustrates a process for establishing and controlling the virtual resource pool accounts, in accordance with embodiments of the invention. As illustrated by block 210 in FIG. 2, the present invention may establish (e.g., create or identify) one or more authentic resource pools. In some embodiments creating one or more authentic resource pools may include opening new actual resource pools from which resources (e.g., funds) will be removed and to which resources will be added based on interactions in which the clients are involved (e.g., interactions with customers). Alternatively, identifying the one or more authentic resource pools may include identifying the resource pools that one or more of the client's 160 previously had with the organization. In some embodiments, the request as to which resource pools should be opened and/or be dedicated as the one or more authentic resource pools, may come from the one or more clients 160. It should be understood that it may be beneficial to have a single authentic resource pool; however, client preferences, regional purposes, country specific rules, or the like that may require a plurality of authentic resource pools in various locations (e.g., within a particular region, a specific country, or the like). For example, some countries may require an actual resource pool located within the country in order to enter interactions within the country. In some embodiments, the one or more clients 160 may decide to close out one or more of the authentic resource pools, or transfer them from authentic resource pools into virtual resource pools.

Block 220 of FIG. 3 illustrates that the one or more virtual resource pools are established. As with the one or more authentic resource pools, the one or more virtual resource pools may be created and/or identified. In some embodiments, creating the virtual resource pools may include forming virtual resource pools with virtual resource pool identifiers (e.g., virtual resource pool numbers) and grouping the plurality of virtual resource pools for eventual presentation to the one or more clients. Alternatively, one or more authentic resource pools may be converted to virtual resource pools and/or virtual resource pools that currently exist may be grouped together. The one or more virtual resource pools are resource pools which do not have any actual resources associated with the pools. That is, there is an accounting of resources, but no actual resources are in the virtual resource pool. For example, if the client tried to remove resources from the virtual resource pool, the client couldn't because there are no resources in the actual resource pool (e.g., the resources are located in a separate authentic resource pool). As such, the one or more virtual resource pools do not require transfer of resources, settlement, reconciliation, or other like processing that is required for authentic resource pools. The virtual resource pools may have virtual resource identifiers (e.g., account characters, numbers, or the like) to allow for an accounting of resources that can be aggregated and displayed to the client for accounting purposes. Consequently, it should be understood that an account or virtual resources may be associated with the one or more virtual resource pools, however, any actual distribution of the resources associated with an interaction are made from an authentic resource pool associated with the virtual resource. It should be understood that the virtual resource pools may have accounts identifiers (e.g., actual account numbers, tokens, or any other type of identifier) just like the authentic resource pools, such that the virtual resource pools in some embodiments may look no different than the authentic resource pools when received by a third party (e.g., a customer).

As illustrated in block 230 of FIG. 3, the one or more virtual resource pools (e.g., a plurality of virtual resource pools) are coupled to one or more authentic resource pools. For example, a plurality of virtual resource pools may be assigned to a single authentic resource pool, such that, any resources associated with an interaction that utilizes a virtual resource pool is distributed through the authentic resource pool to which the virtual resource pool is assigned. In some embodiments, the group of virtual resource pools may be available for a client to configure for use with one or more authentic resource pools. As such, the coupling of the virtual resource pools with one or more authentic resource pools may only be a simple assignment, and the one or more virtual resource pools cannot be utilized until the client activates the one or more virtual resource pools, as will be described in further detail below.

It should be understood that after the one or more virtual resource pools are coupled to the one or more authentic resource pools the client that owns the one or more authentic resource pools and the one or more virtual resource pools has the ability to manage the one or authentic resource pools and the coupled one or more virtual resource pools as the client desires. As such, as will be described in blocks 240 to 270, the client may request that the one or more virtual resource pools be activated, deactivated, configured, transferred, or the like.

Block 240 of FIG. 3, illustrates that in some embodiments a request is received to activate one or more of the one or more virtual resource pools coupled to the one or more authentic resource pools. That is, a client may request the organization to activate a virtual resource pool, such that the client, or a representative associated with the client, may utilize the virtual resource pool for interactions. In some embodiments the client (or a representative associated with the client) may use the virtual resource pools using digital interactions (e.g., card not present and/or user not present at a physical site). Alternatively, activating the virtual resource pool may result in providing a physical card to the client (e.g., mailing a card, or the like). It should be further understood that the client may indicate to which authentic resource pool the virtual resource pool should be assigned (e.g., if the virtual resource pool is available to more than one resource pool) or the client may have to activate a virtual resource pool that is specifically coupled to the authentic resource pool for which the client wants to distribute resources.

FIG. 5 illustrates one embodiment of a resource management interface 500 through which the client may manage resource pools by accessing the resource management interface 500 through a portal. It should be understood that the virtual resource pools may be activated by the client in a hierarchical format such that there is at least one authentic resource pool 510 at the top of the hierarchy, first one or more virtual resource pools 520 under the one or more authentic resource pools 510, second one or more virtual resource pools 530 under the first one or more virtual resource pools 520, third one or more virtual resource pools 540 under the second one or more virtual resource pools 530, and so on. As such, the client has the ability to set up any hierarchical structure of virtual resource pools without the organization having to do anything to open the virtual resource pools or structure them. For example, the client may drag and drop resource pools under different resource pools or under different authentic resource pools. In other examples, the client may assign different virtual resource pools to other virtual resource pools and/or authentic resource pools.

FIG. 3 illustrates in block 250 that along with the request to activate the one or more virtual resource pools, or separate from the request to activate, a request to configure the virtual resource pool with one or more configurations may be received. The configurations may include the resource type (e.g., currency, type of resource pool such as credit, debit, savings, or the like, or other like configuration) associated with the virtual resource pool. The configurations may further include one or more locations (e.g., region, country, province, state, territory, or the like) in which the virtual resource pool may be utilized. The configurations may also include an indication of the user, division, entity, or the like that may utilize the virtual resource pool activated. The configuration may also include limits, which restrict and/or allow the use of virtual resource pools in various locations, with particular third-parties, for particular products, for particular resource amounts, or other configurations.

Block 260 of FIG. 3 illustrates that the virtual resource pool is activated. In some embodiments of the invention the organization controls the resource systems 30, and thus activates the virtual resource pool. In some embodiments the organization is a financial institution, or another entity that may allow a financial institution to access the resource systems 30. Activating the virtual resource pool may mean that the virtual resource pool may be available by the client for use.

It should be further understood that the one or more clients may further control the virtual resource pools and the associated configurations over time. For example, block 270 illustrates that a request (e.g., configuration edit request, a deactivation request) is received to edit one or more virtual resource pools and/or deactivate the one or more virtual resource pools. As such, the client may request to edit any one of the configurations, as previously discussed, for the virtual resource pools. In other embodiments, the client may request to transfer the association for the virtual resource pool to a different authentic resource pool (e.g., switch resource pools). Alternatively, the client may request to deactivate one or more of the virtual resource pools. For example, the client may request to have a particular virtual resource pool deactivated such that it may no longer be utilized by the client (e.g., automatically or by its representative). It should be understood that the virtual resource pool may be deactivated permanently (e.g., deleted) or temporally (e.g., unassigned, to be reassigned). The client may want to deactivate a particular virtual resource pool because it has become misappropriated (e.g., resource pool identifier has been compromised), the business line associated with the virtual resource pool no longer exists, or the like. It should be understood that when a virtual resource pool is reassociated with another virtual resource pool, but the authentic resource pool has not changed only the virtual resources are transferred to the new virtual resource pool. However, it should be understood that when a virtual resource pool is reassociated with another virtual resource pool that is associated with another authentic resource pool and/or when the virtual resource pool is transferred to another authentic resource pool, actual resources may be transferred from the original authentic resource pool to a new authentic resource pool. It should be understood that when a virtual resource pool is deactivated the virtual resources within the virtual resource pool may be assigned to another virtual resource pool to which it is related.

As illustrated by block 280 in FIG. 3, in response to receiving a request described in block 270 from the client, the organization may edit the configuration and/or may deactivate the virtual resource pool, as requested. In this way, the organization systems 10 may access the resource systems 30 and change the stored configurations and/or deactivate the virtual resource pool. It should be understood that the virtual resource pool may be deactivated by removing the coupling from the one or more authentic resource pools. Alternatively, the virtual resource pool may be deactivated by placing the virtual resource pool back into the group of the virtual resource pools that may be reassigned by the client in the future, if necessary. Moreover, the virtual resources within the virtual resource pool will be reassigned as described above with respect to block 270.

It should be understood that in order to take the actions described in the process of FIG. 3, the resource systems 30 may be a part of the organization or may be controlled by another entity that allows access to the organization. As such the organization (e.g., financial institution), may access the resource systems 30 directly and/or through the organization systems 10, in order to establish the authentic resource pools and/or the virtual resource pools and to couple them together. It should be understood that in order to take the actions described in the process of FIG. 3, the client, through the client systems 20, may access the resource systems 30, directly or through the organization systems 10, in order to request to activate, edit the configurations of, and/or deactivate the one or more virtual resource pools.

It should be understood that a client may manage its virtual resource pools (e.g., virtual accounts) for particular representatives or groups of representatives within the client, by activating, editing configurations, and/or deactivating the one or more virtual resource pools. The client may be able to take these actions through an integrated resource pool interface, such as the example integrated resource pool interface 500 illustrated in FIG. 5. As illustrated in the example in FIG. 5, the resource pool interface 500 illustrates that all of the clients one or more resource pools may be displayed to the client, the location of the one or more authentic resource pools (e.g., country, region) may be displayed, the amounts of each of the resource pools may be displayed, a virtual resource pool control dashboard 560 may be displayed, and/or a filter feature 550 may be displayed. The client may be able to expand and/or contract the hierarchy structure of the resource pools as desired (e.g., by using the +/− features 504). The client may also be able to view the details of each selected resource pool (e.g., authentic resource pool and/or virtual resource pool) and control the virtual resource pools to activate, deactivate, and/or edit the configurations thereof using the control dashboard 560. The client may also filter the view the resources in a number of different ways using the filter feature 550. For example, the same virtual resources may be associated with a user, group, line of business, division, entity, region, or the like. As one example, a virtual resource may be part of a region, but may also be a part of a line of business that spans many regions. As such, the filters may be utilized to view different virtual resource pools in a number of different hierarchal structures, such as but not limited to region, divisional, line of business, individual representatives, combinations thereof, or the like.

The integrated resource pool interface (e.g., the interface 500 illustrated in FIG. 5, or the like) may be provided through an online channel or portal platform. Moreover, the online channel or portal platform may be utilized by the client to integrate information about the authentic resource pools and the virtual resource pools into the clients own resource planning and/or resource control applications and systems, and/or reconciling receivables and payables systems and applications. As such, the client may use the integrated resource pool interface to manage the client resource pools as the client sees fit without the organization having to verify and institute each change that the client makes.

FIG. 4 illustrates a process for utilizing the virtual resource pool accounts, in accordance with embodiments of the invention. As illustrated by block 310 in FIG. 4, an interaction indication is received regarding an interaction utilizing a resource pool. The interaction indication may be an interaction that requires approval by the organization, or an interaction that has already occurred. In some embodiments, the interaction indication may include an indication received by the organization (e.g., financial institution) at the organization systems 10, from a third-party through third-party systems 40 or from a client through the client system 20. The interaction may be an interaction (e.g., transaction) between the client and a third-party (e.g., a customer of the client, such as an individual user, another business, or the like). The indication of the interaction may include interaction information, such as, but not limited to a resource pool identifier (e.g., resource pool number), a resource amount associated with the interaction (e.g., including the currency for the interaction, or the like), a third party with which the interaction was entered, a location of the interaction (e.g., country, city, online, in-person, or the like).

Block 320 of FIG. 4 illustrates, that after the indication of the interaction is received, a determination is made if the resource pool utilized for the interaction is a virtual resource pool or an authentic resource pool. For example, the organization systems 10 may interact with the resource systems 30 in order to compare the resource pool identifier received and the stored resource pool identifiers for the one or more virtual resource pools and/or one or more authentic resource pools. Moreover, in the case of determining that the resource pool utilized in the interaction is a virtual resource pool, a determination is also made as to which authentic resource pool the virtual resource is associated. In other embodiments it may be determined that the resource pool is an authentic resource pool (e.g., the resource pool identifier meets an authentic resource pool identifier), and as such, may be processed using traditional methods.

Regardless of whether or not the resource pool is identified as a virtual resource pool and/or an authentic resource pool, a determination of the configuration for the resource pool may be made. The configuration for the resource pool may indicate limits on the resources (e.g., virtual resources or authentic resources), such that the interaction may be allowed or denied depending on whether or not the interaction information meets or fails to meet the one or more configurations for the resource pool. In some embodiments the configuration of the virtual resource pool, may allow for negative balances (e.g., because there are no actual resources associated with the virtual resource pool), and thus may allow the interaction as long as there are the necessary resources in the authentic resource pools. In other embodiments, interactions may be prevented if the balance of resources in the virtual resource pool would drop below zero. It should be understood that the interactions may be allowed or denied based on any of the configurations previously discussed herein.

Depending on a determination that the resource pool is a virtual resource pool and/or the interaction information meets the configuration for the virtual resource pool, the organization systems 10 and/or the resource systems 30 will account for the resources associated with the interaction to the virtual resource pool. As such, the balance of the resources in the virtual resource pool may be adjusted (e.g., increased or decreased) by the resources involved in the interaction in real-time (e.g., in real-time or near real-time). It should be understood that with respect to the virtual resource pools, this is a paper accounting of the resources in the virtual resource pools. As previously discussed, the virtual resource pools do not have any actual resources. However, the balance of the virtual resource pools is adjusted for resource management purposes. That is, it may be beneficial to the client to be able to track resources associated with a division, line of business, individual user, associated with a specific product, or the like by adjusting the balances in virtual resource pools based on the interactions. However, as discussed herein, no actual resources are transferred into or out of the virtual resource pools. The balances for each of the virtual resource pools may be reflected in the resource pool interface 500 in real-time. That is, the resources associated with the virtual resource pools may be automatically accounted for and illustrated.

As illustrated in Block 350 of FIG. 4, instead of transferring the resources associated with the interaction from the virtual resource pool, the actual resources associated with the interaction are transferred using the authentic resource pool to which the virtual resource pool is assigned. As such, the resources are distributed (e.g., credited to or debited from) using the authentic resource pool. Consequently, all of the processes required for transferring the resources (e.g., holding resource amounts, communicating with third-party resource pools to validate resource pools, distributing resource along channel rails, accounting for settlement and reconciliation, or the like) are all performed through the authentic resource pools. As will be discussed in further detail, for large clients, which typically may have thousands of resource pools, consolidating the actual resource pools into a single, or small set of authentic resource pools, greatly reduces the processing capacity, memory requirements, and/or processing times of interactions because instead of having to settle and reconcile each resource distribution for each interaction through each individual resource pool, the virtual resource pools can be balanced instantaneously with any interactions, and all of the processing may be handled through the authentic resource pool. It should be understood that the actual resources may be illustrated within the resource pool interface 500, including the resources for any pending interactions (e.g., shown as pending transfer, allocated for a particular interaction, or the like until the resources are actually distributed).

Block 360 of FIG. 4 illustrates that the interactions for the one or more authentic resource pools and one or more virtual resource pools are monitored by the organization, such as through the organization systems 10 and/or resource systems 30. In this way, the organization may track in real-time any balances of virtual resource pools because they are adjusted regardless of any settlement and/or reconciliation. Alternatively, the one or more authentic resource pools provide an overview of the resources held by the client. Moreover, the accounting for the one or more virtual resource pools may be aggregated and compared with the resources in the authentic resource pools in order to determine the amount of outstanding resources being settled and reconciled. It should be understood that various aggregations may be provided for groups of virtual resource pools in order to track resources for various groups within the client (e.g., different representatives, different lines of businesses, different divisions, or the like). For example, as previously discussed, some virtual resource pools may be a sub-level of another virtual resource pool and/or authentic resource pool, and some authentic resource pools may be a sub-level of another authentic resource pool. As such, there may be a hierarchy of authentic resource pools and/or virtual resource pools such that each of the virtual resource pools and/or authentic resource pools may be aggregated within the hierarchy to provide an individual view and aggregated view of resources at different levels within the hierarchy (e.g., total, division, line of business, business segment, department, individual, or the like), which provides a more real-time view of available resources.

FIG. 4 further illustrates in block 370 that an integrated interface may be provided to the client by the organization to display one or more of the resource pools, such as the hierarchy of the authentic resource pools and the virtual resource pools. The organization systems 10 may present the integrated interface to the client systems 20, in some cases through the resource systems 30. In this way, the client has an overall and detailed view of the resource pools associated with the interactions of the client. For example, the client can look at each of the one or more authentic resource pools and/or the aggregation of the one or more virtual accounts, which incorporate currency changes, settlement, and reconciliation, such that the client has a better overall view of resources on hand without having the delays in resource transfers that may occur if there are actual authentic resource pools across the world in different countries and/or in different currencies. An example of one embodiment of a resource pool interface 500 is illustrated in FIG. 5, which has been discussed throughout this disclosure. As previously discussed, the integrated interface may be provided through an online channel or portal platform. The online channel or portal platform may also be utilized by the client to integrate information about the authentic resource pools and the virtual resource pools into the clients own resource planning and/or resource control applications and systems, and/or reconciling receivables and payables systems and applications.

As previously discussed generally above the present invention improves upon processing capacity, reduces memory requirements, and decreases processing times. For many clients of the organization (e.g., financial institution), the client may have hundreds or thousands of accounts. For each of these accounts the organization has to set up the accounts to for accounting entries, settlements, reconciling, entitlements, sanctions, reporting, control information, and/or processing of any resource distributions. That is not only do the resources associated with the interactions have to be accounted for, but the actual resources have to be transferred, such as through multiple accounts. Moreover, each one of these accounts require reconciliation with other accounts for which the actual accounts are associated (e.g., parent or child accounts). Alternatively, the present invention utilizes a reduced number of authentic accounts, such as one single authentic account in some embodiments, a single authentic account in particular regions or countries in which actual accounts are required, or a plurality of authentic accounts when the client would like to associate funds with different particular entities (e.g., different groups of individual users and/or individual users) within the client. The present invention also utilizes one or more virtual accounts associated with the authentic accounts. The virtual accounts may have account numbers that can be utilized by the client to enter into interactions (e.g., interactions with third-parties). However, the virtual accounts need to only be associated with one or more of the authentic accounts, and when a transaction is entered the virtual account may be adjusted based on the resources associated with the transaction. As described herein the virtual account may illustrate a change in the resources in the account due to an interaction, but it will not include any actual transfer of resources, settlement, reconciliation, or other processing of the resources. The virtual account will simply be an accounting entry of the occurrence of the interaction and associated resources. It should be understood that the authentic resource pool to which the one or more resource pools are associated, will include all of the processing of the resources associated with interactions made using the associated virtual accounts.

The financial institution does not have to undertake all of the processing that is required for each individual account (e.g., currency exchanges, debiting and crediting resources between various accounts, or other like), instead virtual accounts may reflect the interactions, but the actual processing occurs out of a single related authentic account. As such, an organization which would typically have to process and store each of the interactions for each of the accounts and the interactions between internal accounts, now only needs to process all of the interactions out of the single account which reduces the amount of memory storage that is needed because of the reduction of the processing. Moreover, the processing capacity is increased because organization systems 30 have to perform a reduced number of processing steps and have omitted a number of steps that were typically needed to transfer resources from various accounts to other accounts in order to transfer resources associated with interactions. Furthermore, the processing time is reduced because the processing associated with transferring resources between different accounts and the associated storage of the information is now limited to a single authentic account associated with the virtual account. Processing capacity, processing time, and memory is also reduced because the organization is no longer needs to open thousands or hundreds of authentic accounts and manage such accounts for the client. The client is in the best position to know what resource pools the client needs, an thus, can manage the resource pools without having to communication with the organization. Moreover, virtual accounts may be used in various countries that previously required opening actual accounts in those countries, and as such the virtual accounts may be used to create a presence in various countries without having to open actual accounts in those countries. That is the virtual resource pools may be opened in a specific currency of a specific country, but may be associated with an authentic resource pool located in a different country using a different currency. The present invention streamlines the operations of the organization and enables to the client to self-serve its needs for virtual account set-up and maintenance.

The present invention may be implemented in a number of different ways, such as service resource system 30 in which an entity provides the resource system 30 as integration layer between the client systems 20 and the organization systems 10. Alternatively, an entity may offer the service resource system 30 within the organization systems 10 on behalf of the organization. In other implementations the organization may build the resource system 30 itself within its own organizations systems 10.

In some embodiments of the invention, one or more of the systems described herein may be combined with each other, or otherwise perform the functions of the other systems described herein. In other embodiments of the invention, one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems, devices, or components thereof described herein.

It should be understood, that the systems, devices, and components described in FIGS. 1 and 2, or other systems, devices, and components not specifically described herein, may be configured to establish an electronic communications link with each other in order to accomplish the steps of the processes described herein in FIGS. 3 and 4. The link may be an internal link within the same systems or an external link with the other systems of other parties. The information provided by the systems may be made continuously available, however, continuously available does not necessarily mean that the sources actually continuously generate data, but that a sources are continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format.

Moreover, it should be understood that the process flows described herein include transforming the information sent and/or received from the applications of the different systems (e.g., internally or externally) from one or more data formats into a data format associated with each individual system. There are many ways in which information is converted within the system environment 1. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In accordance with embodiments of the invention, the term organization may related to a "financial institution" and/or "financial entity", which includes any organization that processes financial resource transfers including, but not limited to, banks, credit unions, savings and loan associations, investment companies, stock brokerages, asses management firms, insurance companies and the like. In specific embodiments of the invention, use of the term "bank" may be used instead of organization, but may be limited to a financial entity in which account-bearing customers conduct financial resource transfers, such as account deposits, withdrawals, transfers and the like.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It should be understood that "operatively coupled" or "coupled" when used herein, means that the components or connections may be formed integrally with each other, or may be formed separately and coupled together. Furthermore, "operatively coupled" or "coupled" means that the components or the connections may be coupled directly to each other, or to each other with one or more components or applications located between the components or application that are operatively coupled together. Furthermore, "operatively coupled" or "coupled" may mean that the components or connections are detachable from each other, or that they are permanently coupled together.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A virtual resource pool system for control and distribution of resources, the resource pool system comprising:
    one or more memory components storing computer-readable program code; and
    one or more processing components operatively coupled to the one or more memory components, wherein the one or more processing components are configured to execute the computer-readable program code to:
        receive interaction indications for interactions between a client and one or more third-party entities that include a transfer of the resources, wherein the interaction indications include resource pools utilized for the interactions, wherein the interaction indications are received from client systems or third party systems, wherein the interactions are transactions, the resources are funds, the resource pools are accounts used to enter into the interactions with the funds, and the interaction indications include transaction information for the transactions;
        determine the resource pools that are virtual resource pools, wherein the determination is made by comparing resource pool identifiers received from the interaction indications with stored virtual resource pool identifiers, wherein the virtual resource pools comprise virtual accounts with virtual funds;
        determine one or more authentic resource pools associated with the virtual resource pools when any of the resource pools are determined to be the virtual resource pools, wherein the authentic resource pools comprise authentic accounts with the funds;
        apply an accounting of the resources for each of the interactions to each of the virtual resource pools; and
        distribute the resources for each of the interactions using the one or more authentic resource pools associated with the virtual resource pools.

2. The system of claim 1, wherein the one or more processing components are configured to execute the computer-readable program code to:
    establish the one or more authentic resource pools;
    establish the virtual resource pools;
    couple the virtual resource pools to the one or more authentic resource pools; and
    store the coupling of the one or more authentic resource pools and the virtual resource pools in a resource pool database.

3. The system of claim 2, wherein the one or more processing components are further configured to execute the computer-readable program code to:
    receive one or more configurations for the virtual resource pools; and
    wherein applying the accounting of the resources for each of the interactions to each of the virtual resource pools, and distributing the resources for each of the interactions using the one or more authentic resource pools is further based on the one or more configurations associated with the virtual resource pools.

4. The system of claim 3, wherein the one or more configurations comprises at least a resource type associated with the virtual resource pools, and wherein the resources are converted based on the resource type before distributing the resources using the one or more authentic resource pools.

5. The system of claim 2, wherein establishing the one or more authentic resource pools comprises creating new authentic resource pools or identifying the resource pools through which the resources are actually stored, added to, and removed from.

6. The system of claim 2, wherein establishing the virtual resource pools comprises creating new virtual resource pools or identifying the resource pools through which the resources are accounted for virtually.

7. The system of claim 2, wherein coupling the virtual resource pools to the one or more authentic resource pools comprises assigning virtual resource pool identifiers of the virtual resource pools to an authentic resource pool identifier of the one or more authentic resource pools.

8. The system of claim 1, wherein the one or more processing components are configured to execute the computer-readable program code to:
    receive an activation indication for at least one of the virtual resource pools; and
    activate the at least one of the virtual resource pools, wherein after activation the at least one of the virtual resource pools may be utilized for the interactions.

9. The system of claim 1, wherein the one or more processing components are configured to execute the computer-readable program code to:
    receive a deactivation indication for at least one of the virtual resource pools; and
    deactivate the at least one of the virtual resource pools, wherein after deactivation the at least one of the virtual resource pools may not be used for the interactions.

10. The system of claim 1, wherein the one or more processing components are configured to execute the computer-readable program code to:
    receive a configuration edit indication of at least one of the virtual resource pools; and
    edit the configuration of the at least one of the virtual resource pools.

11. A method of using virtual resource pool system for control and distribution of resources, the method comprising:
    receiving, by one or more processing components, interaction indications for interactions between a client and one or more third-party entities that include a transfer of the resources, wherein the interaction indications include resource pools utilized for the interactions, wherein the interaction indications are received from client systems or third party systems, wherein the interactions are transactions, the resources are funds, the resource pools are accounts used to enter into the interactions with the funds, and the interaction indications include transaction information for the transactions;

determining, by the one or more processing components, the resource pools that are virtual resource pools, wherein the determination is made by comparing resource pool identifiers received from the interaction indications with stored virtual resource pool identifiers, wherein the virtual resource pools comprise virtual accounts with virtual funds;

determining, by the one or more processing components, one or more authentic resource pools associated with the virtual resource pools when any of the resource pools are determined to be the virtual resource pools, wherein the authentic resource pools comprise authentic accounts with the funds;

applying, by the one or more processing components, an accounting of the resources for each of the interactions to each of the virtual resource pools; and distributing, by the one or more processing components, the resources for each of the interactions using the one or more authentic resource pools associated with the virtual resource pools.

12. The method of claim 11, further comprising:
establishing, by the one or more processing components, the one or more authentic resource pools;
establishing, by the one or more processing components, the virtual resource pools;
coupling, by the one or more processing components, the virtual resource pools to the one or more authentic resource pools; and
storing, by the one or more processing components, the coupling of the one or more authentic resource pools and the virtual resource pools in a resource pool database.

13. The method of claim 12, further comprising:
receiving, by the one or more processing components, one or more configurations for the virtual resource pools; and
wherein applying the accounting of the resources for each of the interactions to each of the virtual resource pools, and distributing the resources for each of the interactions using the one or more authentic resource pools is further based on the one or more configurations associated with the virtual resource pools.

14. The method of claim 13, wherein the one or more configurations comprises at least a resource type associated with the virtual resource pools, and wherein the resources are converted based on the resource type before distributing the resources using the one or more authentic resource pools.

15. The method of claim 12, wherein establishing the one or more authentic resource pools comprises creating new authentic resource pools or identifying the resource pools through which the resources are actually stored, added to, and removed from.

16. The method of claim 12, wherein establishing the virtual resource pools comprises creating new virtual resource pools or identifying the resource pools through which the resource are accounted for virtually.

17. The method of claim 12, wherein coupling the virtual resource pools to the one or more authentic resource pools comprises assigning virtual resource pool identifiers of the virtual resource pools to an authentic resource pool identifier of the one or more authentic resource pools.

18. The method of claim 11, further comprising:
receiving, by the one or more processing components, an activation indication for at least one of the virtual resource pools, and activating, by the one or more processing components, the at least one of the virtual resource pools, wherein after the activation the at least one of the virtual resource pools may be utilized for the interactions;
receiving, by the one or more processing components, a deactivation indication for at least one of the virtual resource pools, and deactivating, by the one or more processing components, the at least one of the virtual resource pools, wherein after the deactivation the at least one of the virtual resource pools may not be used for the interactions; or
receiving, by the one or more processing components, a configuration edit indication of at least one of the virtual resource pools, and editing, by the one or more processing components, the configuration of the at least one of the virtual resource pools.

19. A computer program product for using a virtual resource pool system for control and distribution of resources, the computer program product comprising at least one non-transitory computer-readable medium having computer-readable program code portions embodied therein, the computer-readable program code portions comprising:
an executable portion configured to receive interaction indications for interactions between a client and one or more third-party entities that include a transfer of the resources, wherein the interaction indications include resource pools utilized for the interactions, wherein the interaction indications are received from client systems or third party systems, wherein the interactions are transactions, the resources are funds, the resource pools are accounts used to enter into the interactions with the funds, and the interaction indications include transaction information for the transactions;
an executable portion configured to determine the resource pools that are virtual resource pools, wherein the determination is made by comparing resource pool identifiers received from the interaction indications with stored virtual resource pool identifiers, wherein the virtual resource pools comprise virtual accounts with virtual funds;
an executable portion configured to determine one or more authentic resource pools associated with the virtual resource pools when any of the resource pools are determined to be the virtual resource pools, wherein the authentic resource pools comprise authentic accounts with the funds;
an executable portion configured to apply an accounting of resources for each of the interactions to each of the virtual resource pools; and
an executable portion configured to distribute the resources for each of the interactions using the one or more authentic resource pools associated with the virtual resource pools.

20. The computer program product of claim 19, wherein the computer-readable program code portions further comprise:
an executable portion configured to establish the one or more authentic resource pools;
an executable portion configured to establish the virtual resource pools;
an executable portion configured to couple the virtual resource pools to the one or more authentic resource pools; and an executable portion configured to store the coupling of the one or more authentic resource pools and the virtual resource pools in a resource pool database.

\* \* \* \* \*